United States Patent
Bilsborough

(10) Patent No.: US 8,266,109 B1
(45) Date of Patent: Sep. 11, 2012

(54) PERFORMANCE OF SCANNING CONTAINERS FOR ARCHIVING

(75) Inventor: Michael T. Bilsborough, Reading (GB)

(73) Assignee: Symantec Corporation, Mountain View, CA (US)

( * ) Notice: Subject to any disclaimer, the term of this patent is extended or adjusted under 35 U.S.C. 154(b) by 138 days.

(21) Appl. No.: 12/720,378

(22) Filed: Mar. 9, 2010

(51) Int. Cl.
*G06F 17/00* (2006.01)

(52) U.S. Cl. ........ 707/661; 707/689; 707/692; 711/161; 711/171

(58) Field of Classification Search .................. 707/661, 707/665, 689, 692, 694, 999.204; 711/616, 711/171
See application file for complete search history.

(56) References Cited

U.S. PATENT DOCUMENTS

| | | | |
|---|---|---|---|
| 7,913,053 B1* | 3/2011 | Newland | 711/172 |
| 2006/0031357 A1* | 2/2006 | Misra et al. | 709/206 |
| 2008/0034018 A1* | 2/2008 | Cisler et al. | 707/204 |
| 2008/0133621 A1* | 6/2008 | Bozionek et al. | 707/204 |
| 2008/0154956 A1* | 6/2008 | DeBie | 707/104.1 |
| 2008/0154969 A1* | 6/2008 | DeBie | 707/200 |
| 2008/0154970 A1* | 6/2008 | DeBie | 707/200 |
| 2009/0164532 A1* | 6/2009 | Prahlad et al. | 707/204 |
| 2009/0327366 A1* | 12/2009 | Alexander et al. | 707/204 |
| 2010/0211549 A1* | 8/2010 | Shetty et al. | 707/665 |
| 2011/0191475 A1* | 8/2011 | Sudit | 709/226 |

\* cited by examiner

*Primary Examiner* — Dennis Truong
(74) *Attorney, Agent, or Firm* — Campbell Stephenson LLP

(57) ABSTRACT

Various systems and methods for performing archive operations are disclosed. One method involves receiving a request to perform an archive operation on a number of data storage containers. The request is received by an archive computer system. A determination is made whether to exclude a given storage container from the archive operation based on information stored in a profile.

15 Claims, 4 Drawing Sheets

PERFORMANCE OF SCANNING CONTAINERS FOR ARCHIVING

FIELD OF THE INVENTION

The present invention relates to the field of data protection and more particularly to archiving data.

DESCRIPTION OF THE RELATED ART

Archiving data items moves data items from a primary storage facility to an archive storage facility. Archiving can be performed in a manner that does not restrict the accessibility of the data items. Archiving is a way of improving the performance of various types of computer systems. Archiving provides advantages both in terms of hardware resource usage and software resource usage.

One advantage is more efficient use of computer storage space. Computer systems typically have access to multiple types of storage space (e.g., hard drive, random access memory (RAM), etc). Higher quality memory generally provides faster access and increased reliability, but is also more expensive and limited in size. Archiving generally moves older or unused items from higher quality memory to lower quality memory. Storing these items in higher quality memory does not effectively take advantage of the performance benefits of the higher quality memory. That is, it is beneficial to store items that are likely to be more frequently accessed in the higher quality memory.

An additional advantage of archiving is improved software performance. When an application is started, data items used by the application are loaded into memory, for example into a computer's RAM. Archived data items are not loaded, thus the application can start more quickly. The application also has more memory available to store data used in performing the application's functions, thus the application's performance is improved.

Typically, archive systems archive data items based on the age of the data items. To do so, an archive system can determine how old a given data item is. If the age of the data item exceeds a specified threshold, the archive system will archive the data item. If the age of the data does not exceed the specified threshold, the archive system will not archive the data item.

Determining the age of a data item uses resources, including time and computing resources (e.g., processing cycles, I/O operations, and the like). The amount of resources used to determine the age of a data item is generally small compared to the amount of resources needed to actually archive a data item. However, as the number of data items in an archive system becomes large, the resources expended to determine whether or not to archive data items becomes considerable. In an archive system in which the majority of data items do not meet the archive threshold, the majority of the archive system's resources may be spent in simply determining whether or not to archive data items, rather than actually performing archive operations.

Archive operations are typically scheduled to have minimum impact on the systems whose data items are being archived. For example, an archive system for a company may perform archive operations overnight, so that the company's users are not affected by unavailability of the computing resources that are engaged in performing archive operations. Thus, the capability to complete archive operations within a given window of time is an important factor in archive systems. An archive system that wastes resources in determining whether to archive data items may be unable to complete archive operations in a timely fashion. Such a system may be considered inefficient.

SUMMARY OF THE INVENTION

Various systems and methods for performing archive operations are disclosed. For example, one method involves receiving a request to perform an archive operation on a number of data storage containers. The request is received by an archive computer system. A determination is made whether to exclude a given storage container from the archive operation based on information stored in a profile.

The foregoing is a summary and thus contains, by necessity, simplifications, generalizations and omissions of detail; consequently those skilled in the art will appreciate that the summary is illustrative only and is not intended to be in any way limiting. Other aspects, inventive features, and advantages of the present invention, as defined solely by the claims, will become apparent in the non-limiting detailed description set forth below.

BRIEF DESCRIPTION OF THE DRAWINGS

The present invention may be better understood, and its numerous objects, features and advantages made apparent to those skilled in the art by referencing the accompanying drawings.

Figure 1:
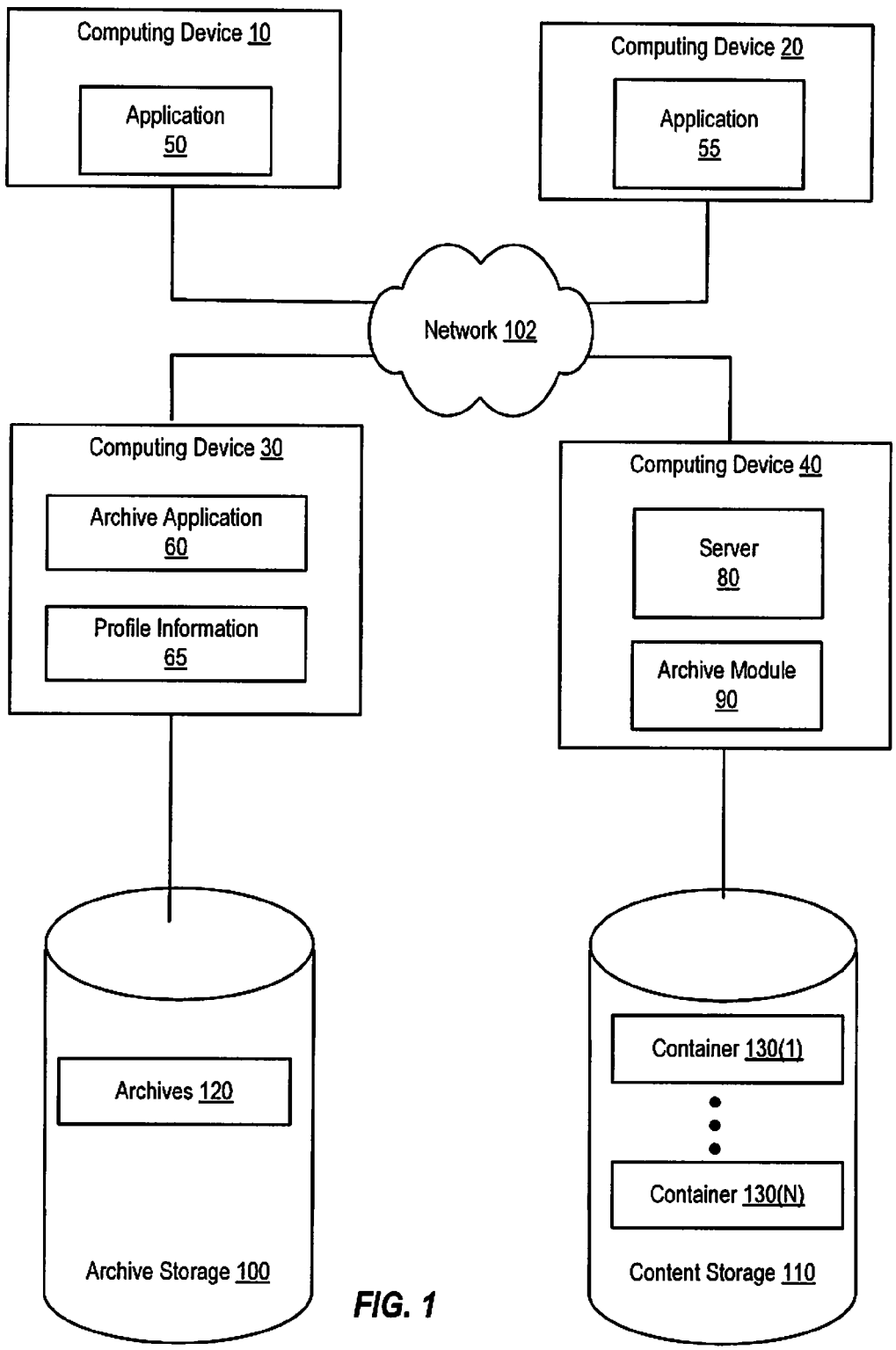
FIG. 1 is a block diagram of an archive system, according to one embodiment of the present invention.

While the invention is susceptible to various modifications and alternative forms, specific embodiments of the invention are provided as examples in the drawings and detailed description. It should be understood that the drawings and detailed description are not intended to limit the invention to the particular form disclosed. Instead, the intention is to cover all modifications, equivalents and alternatives falling within the spirit and scope of the invention as defined by the appended claims.

DETAILED DESCRIPTION

FIG. 1 is a block diagram of an archive system. As shown, the system includes computing device 10, computing device 20, computing device 30, and computing device 40. Computing devices 10 and 20 implement applications 50 and 55, respectively. Computing device 30 implements an archive application 60 and stores profile information 65. Computing device 40 implements a server 80 and an archive module 90. In one embodiment, archive application 60 and archive module 90 are each implemented using the Enterprise Vault™ family of products, available from Symantec, Corp. of Cupertino, Calif.

In the example of FIG. 1, computing device 10, computing device 20, computing device 30, and computing device 40 are coupled by a network 102. Network 102 can include one or more storage, local, and/or wide area networks. Network 102 can be implemented using various topologies, communication protocols, and physical links (e.g., wireless links, coaxial cables, and the like). In some embodiments, certain components may be directly connected, as opposed to being connected via a network.

Server 80 provides one or more services to clients. The services provided by server 80 can include data access and retrieval (e.g., if server 80 is a web server, database server, or file server). Server 80 can also or alternatively implement business logic to perform various business functions. For example, server 80 can provide search engine functionality, email services (e.g., such as those provided by Microsoft™ Exchange Server, available from Microsoft Corporation of Redmond, Wash.), data collaboration and/or portal management services (e.g., as provided by SharePoint™ Server, available from Microsoft Corporation of Redmond, Wash.), directory services (e.g., as provided by Active Directory™, available from Microsoft Corporation of Redmond, Wash.), or any other desired functionality.

Applications 50 and 55 are clients of server 80. Applications 50 and 55 can be instances of the same application or different applications. For example, application 50 can be an email program and application 55 can be a database program.

Server 80 maintains data items organized into one or more containers 130(1)-130(n) (collectively referred to as containers 130). In one example, container 130(1) is an electronic mailbox associated with a particular email address or user that can contain multiple data items (e.g., emails). Container 130 can be any logical grouping of data items generated and/or maintained by an application. For example, in the context of a file system application, a container can be a directory and data items files in the directory. In the context of an email server, a container can be a mailbox and data items emails in the mailbox. In the context of a database management system, a container can be a table, and the data in the rows or columns the data items in the table. It is noted that these are simply a few examples, and other embodiments exist.

Containers 130 store data items that are provided to and/or received from clients by server 80, as well as data items generated and/or consumed by server 80 in the process of managing the other data items being provided to and/or received from clients. Containers 130 are stored in content storage 110. Content storage 110 is a storage device that is accessible to server 80.

Archive application 60 is configured to manage the performance of archive operations. An archive operation creates an archive of one or more of containers 130. An archive includes both a copy of a data item stored in archive storage 100 and a reference to the copy. The reference is stored in the original location of the data item (e.g., one of containers 130) or in a location that allows the data item to be located and used (e.g., by server 80) as though the data item had not been moved. That is, archiving a data item does not impair access to the data item by applications that previously had access to the data item.

Archive application 60 uses profile information 65 when performing archive operations. Profile information 65 includes information describing data items in one or more of containers 130. For each container, information such as the age, size, and number of data item(s) in the container can be included. Archive application 60 can improve the performance of archive operations by using profile information 65 to identify containers 130 that can be excluded from an archive operation. Archive application 60 can detect that certain containers should not be processed based on profile information 65, thus conserving computing resources. For example, archive application 60 can consult a profile prior to or during an archive operation. If profile information in the profile indicates that a given container does not contain more than a predetermined number of archivable data items, archive application 60 can exclude the container from an ongoing or upcoming archive operation.

Archive application 60 also manages the storage of archives 120 in archive storage 100. Archives 120 contain data items copied from one or more of containers 130. Archive storage 100 is a storage device that is accessible to archive application 60.

Archive application 60 interacts with archive module 90 to perform an archive operation. Archive application 60 informs archive module 90 that one or more of containers 130 is included in a requested archive operation. Archive module 90 can inform archive application 60 whether data items in containers 130 meet an archive criteria and archive application 60 can copy any data items that do meet the archive criteria from containers 130 to archives 120.

As noted above, a pointer or reference can be stored in container 130 in place of a data item that is copied to archives 120. This allows server 80 to still access the data item that has been copied to archives 120. Generally the pointer uses less storage than the data item. Alternatively, a reference or flag can be created that indicates that one or more items have been moved to archive storage. Archiving data items in this way allows the data items to remain accessible while reducing the amount of storage used in content storage 110.

Archive module 90 can also monitor content storage 110 and notify archive application 60 when additional containers are added (e.g., new containers created or containers copied from other storage devices). Archive module 90 can also detect when containers are removed (e.g., containers deleted or copied to other storage devices).

As noted above, content storage 110 and archive storage 100 are storage devices. These storage devices can be logical storage devices, such as volumes, or physical storage devices, such as solid state memory (e.g., Flash memory devices), magnetic storage (e.g., hard disks or tapes), and/or optical storage (e.g., digital versatile discs (DVDs) and/or compact discs (CDs)), or groups of multiple such storage devices (e.g., optical storage jukeboxes, tape libraries, hard disk arrays such as just a bunch of disks (JBOD) arrays or redundant array of independent disks (RAID) arrays, and the like). If content storage 110 and/or archive storage 100 are logical storage devices, those logical storage devices can in turn be implemented on underlying physical storage devices.

Figure 2:
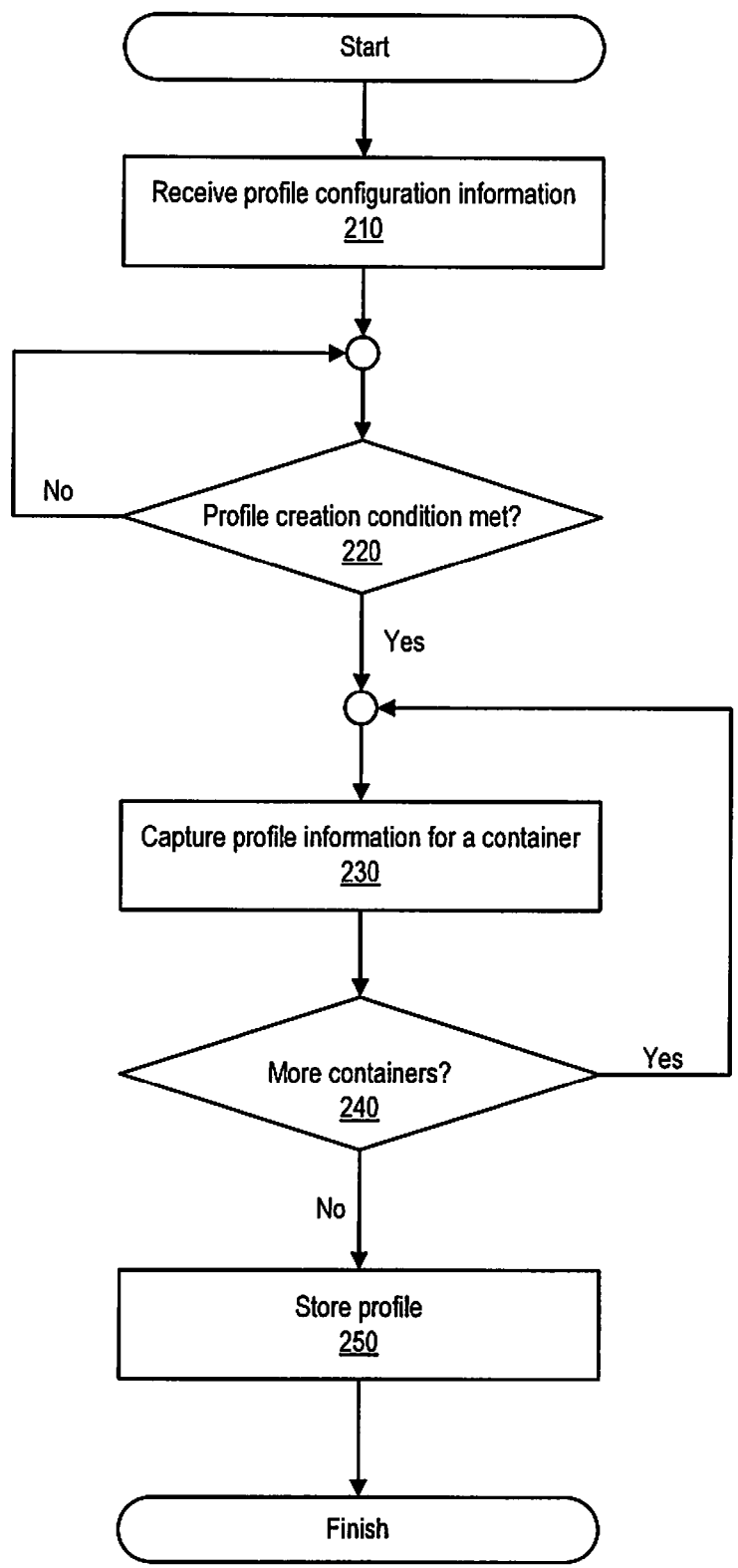
FIG. 2 is a flowchart of a method of creating a profile that is used in an archive operation, according to one embodiment of the present invention.

FIG. 2 is a flowchart of a method of creating a profile. The profile can be used in an archive operation. This method can be performed by an archive application, such as archive application 60 of FIG. 1, in conjunction with an archive module, such as archive module 90 of FIG. 1. The manner in which the archive application creates a profile depends on how the archive application is configured, which depends on the values of a number of parameters. The archive application receives profile configuration information (e.g., values for various parameters) at 210. Example profile configuration information includes: which containers to create a profile for, one or more profile creation conditions, when to create a profile, what information to gather for the profile, an archive criteria, and profile storage details.

Thus at 210, the archive application can receive information specifying which containers to create a profile for. Alternatively, the archive application can default to generating a profile for all containers. In the example where the archive application receives information, the information can specify one or more containers, including all containers accessible to the archive application, or a subset of those containers. For example, the archive application can receive a listing of one or more containers.

The archive application may also, or alternatively, receive (at 210) information specifying a profile creation condition. In one embodiment, the profile creation condition specifies a frequency with which the archive application creates a profile for the specified container(s). For example, the profile creation frequency could indicate that the archive application should create a profile on a daily, weekly, or monthly basis. Alternatively, the profile creation frequency could be set to some other recurring period. In another embodiment, the profile creation condition specifies a one time event (e.g., a specific date, addition of a certain amount of new data items to the archive system, the age of a profile, or the like). For example, the archive application can detect the age of a profile and create a new profile if the profile is older than a specified (in the configuration information) number of days.

The archive application can also, or alternatively, receive information (at 210) indicating when to create a profile. The information can specify whether the archive application generates a profile in a standalone operation (i.e. independently of any archive operation) or if the archive application combines profile generation with performing an archive operation. If the received information indicates the profile is to be generated independently, the received information also specifies when (e.g., a date and time) to generate the profile. If the received information indicates the profile is to be generated in conjunction with the performance of an archive operation, the received information can specify when the archive operation occurs. For example, the received information can specify that a profile should be generated in conjunction with the performance of a single specific archive operation (e.g., March 4, 11 PM), or in conjunction with a recurring archive operation (e.g., every Tuesday, 11 PM). In this example, the archive application collects profile information for a container while archiving any data items in the container that need to be archived.

The archive application can also receive information (at 210) specifying what information to gather when a profile is created. The information can specify that the archive application should collect various pieces of information about a container and the container's data items. For example, the information can specify that the archive application should detect and store the size, creation date, and access date for each of the data items in a container. The information can also specify that the archive application should detect and store the number of items in a container, the number of items in the container that meet a specified condition, the total size of a container, and when the container was last accessed.

The archive application can also receive information (at 210) specifying archive criteria, such as age of a data item, or the last time a data item was accessed. The archive application can collect profile information for certain data items and not for others based, for example, on the age of the data items or other archive criteria.

The archive application also receives information specifying a profile name, file type, and storage location. When the archive application creates a profile, the archive application names the profile based on the specified profile name. The archive application also creates a particular type of profile, based on the specified type such as a text file, a database file, or another type of file. That is, a profile is stored as a particular type of file or object. The archive application also stores the profile in the specified location, such as a particular disk drive or directory.

Typically a user having administrative privileges (administrator) accesses the archive application (e.g., a graphical user interface, command line interface, or the like) and inputs specific values for the configuration information discussed above. In other embodiments, the values of the configuration information can be determined automatically (e.g., default values or values based on archive operation performance metrics). Alternatively, the archive application can obtain such information from an external file or other location.

At 220, the archive application detects whether a profile creation condition is met. In one embodiment, this involves detecting a profile's age and comparing the profile's age with a value of a specified profile creation condition parameter. Consider an example in which the archive application received a value of seven days as a profile creation condition. If the archive application detects that a profile is less than seven days old, the method returns to 220 (loops). If, however, the profile is greater than seven days old, the archive application will create a new profile. The archive application can default to creating a profile unless the archive application detects that a profile condition is not satisfied. Thus, if no profile exits, the archive application will create a profile.

In one embodiment, the archive application is configured to generate a profile in conjunction with performing an archive operation. That is, profile generation is tied to a specified archive operation. In this embodiment, the profile condition creation of 220 is not met until the specified archive operation begins.

If the profile creation condition is met too frequently, the archive application generates profiles too frequently, wasting the resources used to generate the profile. However, if the profile creation condition is met too infrequently, a profile can become "stale." A stale profile is one that does not improve archive operation performance as a result of not having accurate (or any) information regarding an upcoming archive operation. For example, consider a profile that contains information concerning the next three upcoming archive operations. That is, the profile indicates if any containers should be excluded from each of the next three archive operations. If the profile creation condition is not met (triggering creation of a new profile) until after the next five upcoming archive operations have been performed, there is no profile information available for the last two archive operations of the five scheduled archive operations. That is, for the fourth and fifth upcoming archive operations, no profile information is available to improve performance of those archive operations. Thus the profile has become stale and the profile creation condition is met too infrequently.

Another example of a stale profile can arise if changes to a container take place between the creation of a profile and the next time the profile creation condition is met. In this example, the profile was created before changes to a container occurred, so the profile does not contain information regarding the changed (e.g., new, deleted, or updated) data items. Thus the profile information is incomplete, and the profile is stale. Factors such as wanting to prevent profiles from going stale, as well as a desire to minimize the costs (in computing resources) of increasing the frequency of generating profiles can be considered in determining what value to specify for the profile creation condition.

Once the archive application detects that the profile creation condition is met, for example the age a specified profile exceeds seven days, the method proceeds to 230. At 230, the archive application captures profile information. In an embodiment in which the archive application is configured to collect profile information for specified containers, the archive application selects a specified container (e.g., from a list of specified containers). In an embodiment in which the archive application is configured to collect profile information for all of a system's containers, the archive application selects a first container.

Certain containers may not need to be included in a profile. For example, if a container containing critical data items is to be included in all archive operations, and not excluded, then profile information for that container need not be collected.

The archive application detects and stores specified profile information for the selected container. The archive application collects profile data based on the archive application's profile configuration values. In one example, the archive application's profile configuration values can indicate that the number of data items that are a specified number of days old be counted. The archive application can also calculate the size of the data items. The number and size of the data items that are the specified number of days old is can be stored in a profile. The profile configuration values can also specify that the number and size be detected for data items that will meet a specified age criteria on a specified date in the future. This date is known as the eligible date, as the date indicates when a data item becomes eligible to be included in an archive operation. The date can be specified explicitly, or in relative terms. If in relative terms, the archive application can specify an amount of time until the specified date. Alternatively, the archive application can specify one or more actual dates on which the data items will exceed the specified age criteria.

The amount of profile information the archive application collects can depend on the specified age. For example, if the archive application is configured to collect profile information for data items that are older than 85 days, the archive application collects profile information for data items older than 85 days. If this value is set at 87, the archive application collects profile information for data items older than 87 days. The number of data items older than 85 is likely to be greater than the number of items older than 87 days, thus more profile information will likely be collected if this parameter is set at 85 than if the parameter is set at 87.

At 240, the archive application detects whether there are more containers specified. For example, the archive application can access a list of specified (e.g., by a user) containers stored in the archive application's profile configuration parameters. If there are more containers, the method returns to 230. Otherwise, the archive application stores the profile at 250. The archive application stores the profile according to received configuration information, as discussed above.

Figure 3:
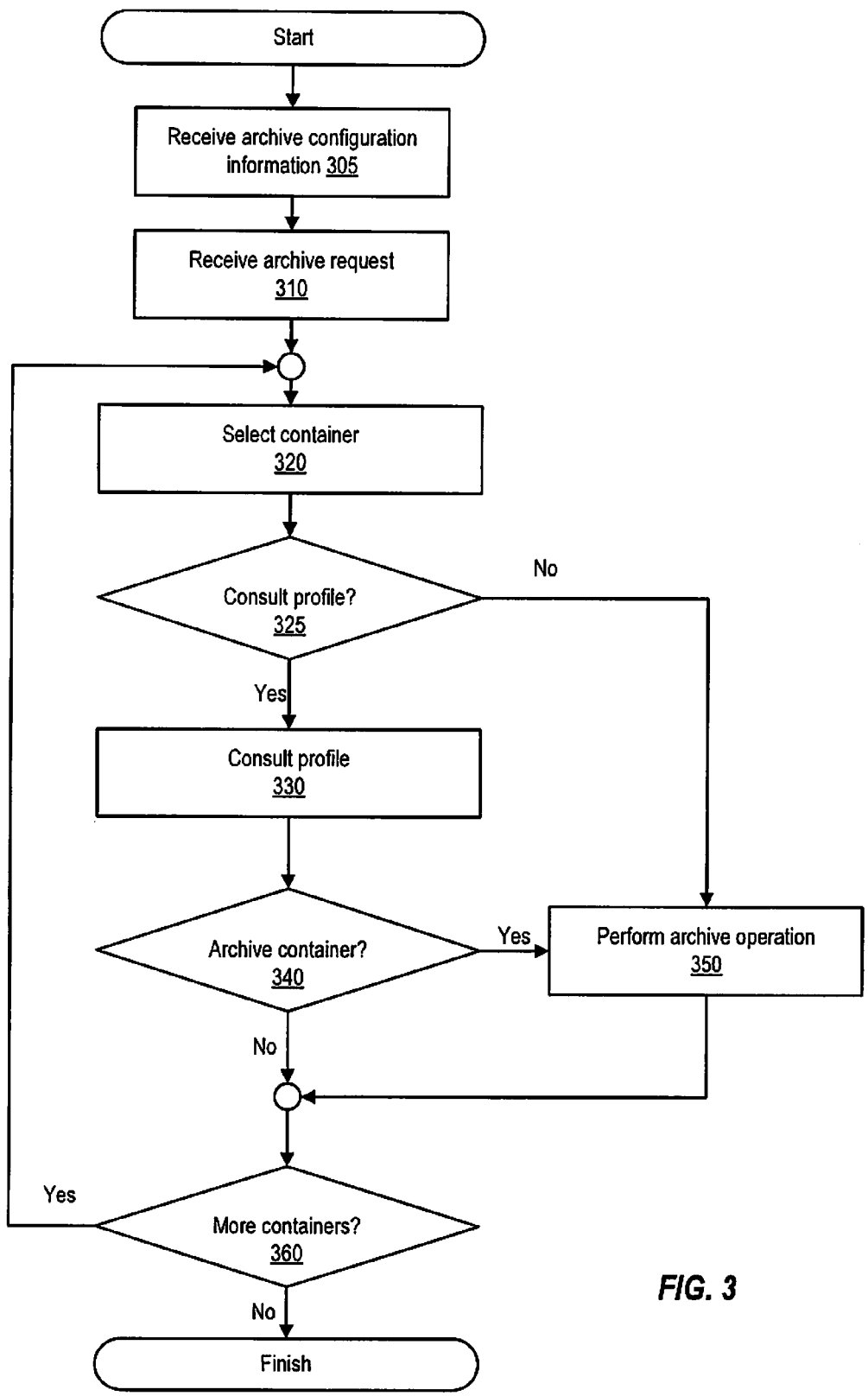
FIG. 3 is a flowchart of a method of performing an archive operation, according to one embodiment of the present invention.

FIG. 3 is a flowchart of a method of performing an archive operation. The method can be performed by an archive application, such as archive application 60 of FIG. 1, in conjunction with an archive module, such as archive module 90 of FIG. 1.

The method begins at 305 with the archive application receiving configuration information that controls the manner in which an archive operation is performed. In one example, the archive application receives configuration information specifying: which data items to archive, when an archive operation occurs, how data items are handled after being archived, whether an archive operation is affected by a profile, and an archive threshold.

The archive application receives configuration information indicating which containers to include in an archive operation. The configuration information can specify one or more containers, including all of an archive system's containers or a subset of the archive system's containers. For example, the archive application can receive a listing of one or more containers. In one example, the containers are electronic mailboxes belonging to employees of a company. In this example, the configuration information can specify mailboxes belonging to specific users or groups of users, for example executives.

The archive application also receives configuration information indicating when an archive operation will occur. For example, the configuration information can specify that the archive application perform a single archive operation or multiple archive operations, e.g., on a periodic basis. The configuration information can specify a period, or frequency, to perform archive operations, as well as one or more specific times and dates. For example, the configuration information can specify that archive operations be performed at 11 PM each Tuesday.

Additional configuration information relates to how data items are handled once the data items have been archived. The archive application receives configuration information specifying how long these archived data items should be kept. For example, the configuration information can specify that archived data items be stored for two years and then deleted. In one embodiment the configuration information specifies a quantity of data. When the archive application detects that a quantity of archived data exceeds the specified quantity, the archive application can delete, for example, the least recently archived data items.

The archive application also receives configuration information specifying a location to store an archived container. For example, the archive application can have access to multiple archive storage devices having different capabilities, such as storage capacity and access time. The configuration information can specify a storage area, for example, by specifying a path or address for the storage area. Alternatively, the configuration information can specify a capability requirement for a storage resource. In this alternative, selection of the particular storage location is performed based on the specified capability requirement (e.g., access time).

The archive application also receives configuration information indicating whether to compress archived data items and if so, the type and amount of compression. The type of compression affects how long it takes to archive data items as some compression algorithms are faster than others. Generally, increasing the amount of compression for a data item results in reducing the amount of storage required to store the data item. However, increasing the amount of compression usually increases the amount of time required to perform the archive operation.

The archive application also receives configuration specifying a data item archive criteria. The data item archive criteria indicates whether a given data item should be archived. One example of a data item archive criteria is the age of a data item. Another example is the last access time of the data item. When the configuration information specifies that the last access time is the data item criteria, data items can be included or excluded from archive operations based on when the last time the data items were accessed (e.g., read or updated by an application). For example, the archive application can detect when a data item was last accessed and include or exclude data items from an archive operation based on when the data items were last accessed relative to other data items, regardless of whether the age of the data items is older than a specified age.

In the example where the data item archive criteria is age of the data item, the archive application can select a data item to archive based on whether the data item is older than a specified age, i.e., was created before a specified date. For example, the configuration information can specify that data items older than ninety days be archived.

The archive application also receives configuration information specifying whether the archive application should consult a profile or profiles in performing the archive operation. For each container that is specified as being included in an archive operation, the archive application can, based on the configuration information, consult a profile to detect if the archive application should actually archive the container or if the archive application should exclude the container. The configuration information also specifies which profile (if any)

to consult. If the configuration information does not specify a profile for a given container or containers, the archive application does not consider any profile information for containers specified by this parameter. Those containers will not be excluded from archive operations based on profile information.

The archive application also receives configuration information specifying a threshold value which the archive application uses to determine whether or not to archive a container. The threshold value can specify an amount of data or a number of items. For example, if the configuration information specifies a value of two megabytes, a given container having less than two megabytes of content to be archived should be excluded from archive operations, e.g., by the archive application.

Typically, the archive operation configuration information is specified by an administrator. For example, the archive application can display (e.g., via a graphical user interface) a list of all containers accessible to the archive application. The administrator can select which containers to include in an archive operation and input the selection to the archive application. Alternatively, an administrator can perform a search for a particular container (e.g., based on a keyword in the title of the container, or based on a user associated with the container). The configuration information can alternatively be specified in a configuration file, via a command line interface, or using any other appropriate technique.

After the archive application has received archive operation configuration information, the archive application receives a request to perform an archive operation on one or more containers at 310. In one example, receiving the request involves the archive application detecting that a specified condition has occurred, such as a specified date and time having arrived. The archive application can initiate an archive operation once the archive application detects the occurrence of the condition. The archive application detects which container(s) are to be archived and initiates an archive operation for those specified container(s).

In one example there are multiple containers to archive, and the archive application selects a container at 320. The containers to be archived can be specified by the configuration information (as above) or by a request to perform an archive operation. Typically the archive application selects the first container in a list of containers, but other criteria, such as importance of data items stored in the containers, can be used to determine an order in which the containers are selected and archived.

At 325, the archive application detects whether the selected container is subject to profile constraints, e.g., by evaluating received configuration information. If not, the archive application will not consult a profile for this container and instead continues with the archive operation.

If the archive application detects that a profile should be consulted for the selected container, at 330, the archive application detects which profile (e.g., by accessing the received configuration information) and consults the specified profile, which may contain profile information for one or more containers. The archive application first determines if the container being archived is listed in the profile. If the container is listed in the profile, the archive application detects whether the container should be archived or excluded from the archive operation. For example, the archive application can detect that a given container does not meet a specified criteria and based on that fact, will not be archived. Alternatively, if a the given container does meet a specified criteria, the archive application includes the container in an archive operation. To detect whether to include a given container in an archive operation, in one example, the archive application detects whether the current date (the date on which the archive operation is being performed) matches or is later than an eligible date in the profile. If so, the archive application will calculate the total size of archive eligible data items between the first eligible date and the current eligible date. The archive application will then compare the sum with a specified archive threshold at 340. If the sum exceeds the specified threshold, the archive application will perform an archive operation on the container at 350. If the sum does not exceed the specified threshold, the archive application will exclude the container from the archive operation. Instead, the archive application will detect (at 360) whether more containers were specified in the archive request. If so, the method returns to 320, where the archive application selects the next container.

Table 1 shows an example profile. In this example, the profile information includes a container identifier field. This field is populated with the container identifiers for which the archive application is to generate profile information, Mbx 1 and Mbx 2 in this example. The profile also includes an eligible date field and a number of eligible dates. The eligible dates are dates for which an amount of data has been calculated, the data having exceeded an archive criteria. In this example, the profile information includes information for four eligible dates for each container. The archive application can collect profile information for more or fewer dates. The archive application can collect profile information for a range of sequential dates or for specific dates. The profile information also includes a number of items field and total size field. These fields contain information indicating a number of data items and an amount of data that become eligible for inclusion in an archive operation on the eligible date.

TABLE 1

An example profile.

| Container ID | Eligible Date | No. of Items | Total Size |
|---|---|---|---|
| Mbx 1 | March 25 | 25 | 1800K |
| Mbx 1 | March 26 | 16 | 300K |
| Mbx 1 | March 27 | 12 | 400K |
| Mbx 1 | January 4 | 18 | 1000K |
| Mbx 2 | March 25 | 30 | 1500K |
| Mbx 2 | March 26 | 1 | 30K |
| Mbx 2 | March 27 | 2 | 50K |
| Mbx 2 | January 4 | 3 | 35K |

In the above example, 16 data items in container Mbx 1, representing 300 kilobytes of data, become eligible for archiving on March 26. Data items become eligible for archiving as a result of meeting a data item archive criteria, such as age. For example, the archive application can specify that only data items ninety days old or older should be archived. In the table above, 16 additional data items in Mbx 1 will meet the data item archive criteria on March 26. In one example, the 16 data items are 89 days old on March 25 and turn 90 days old on March 26, thus satisfying a data item archive criteria. Whatever the data item archive criteria, the archive application detects that on March 26, 300 kilobytes more data in Mbx 1 are eligible for data than March 25, and stores this information in the profile.

The archive application also detects that on March 27, 400 kilobytes of additional data items become eligible for archiving. Presuming an archive operation was performed on March 24, there would be no data eligible for archiving immediately following the archive operation. The archive application can calculate a sum of the amount of data becoming eligible for archiving and determine whether a container should be excluded. Consider an example in which an archive threshold is set at 2 megabytes of data. That is, if there are less than 2 megabytes of eligible data in a container, the container should be excluded from an archive operation. The archive application uses the archive threshold (e.g., at 340 of FIG. 3) to exclude containers from archive operations if the containers have relatively small amounts of data to archive. In such cases, the archive application would take a relatively long time to scan the container to archive a relatively small amount of data and doing so is not worth the computing resources. In the example where the archive threshold is 2 megabytes, Mbx 1 is excluded from an archive operation performed on March 25 since only 1.8 megabytes in container Mbx 1 are eligible for archiving. However, on March 26, an additional 300 kilobytes of data in Mbx 1 become eligible, bringing the total to 2.1 megabytes of data in Mbx 1 eligible for archiving. The archive application calculates this sum and detects that the sum meets the archive threshold. The archive application will no longer exclude Mbx 1 from an archive operation as long as Mbx 1 meets the archive threshold. Instead, the archive application will include Mbx 1 in an archive operation (e.g., at 350 of FIG. 3).

Returning to FIG. 3, if a selected container is not excluded from archive operations based on information in a profile, the archive application includes the container in an archive operation at 350. At 350, the archive application detects the age of a data item in the container (assuming age is the archive criteria) and archives the data item if the data item's age is greater than the specified archive criteria. In one example, the archive criteria is set to ninety days old or older. In this example, if a data item is less than ninety days old, the data item will not be archived. In order to detect the age of each data item in a container, the archive application performs a scan of the container. Scanning the container, in this example means detecting the age of each data items in the container. The archive application compares each data item's age with the data item archive criteria to determine whether the data item will be archived. In one example, the archive application proceeds sequentially through a container and for each data item in the container the archive application detects whether an item will be archived, e.g., by comparing the data item's age with a data item archive criteria. If the data item is to be archived, the archive application archives the data item and then proceeds to the next data item in the container. If the data item is not to be archived, the archive application moves on to the next data item in the container.

Figure 4:
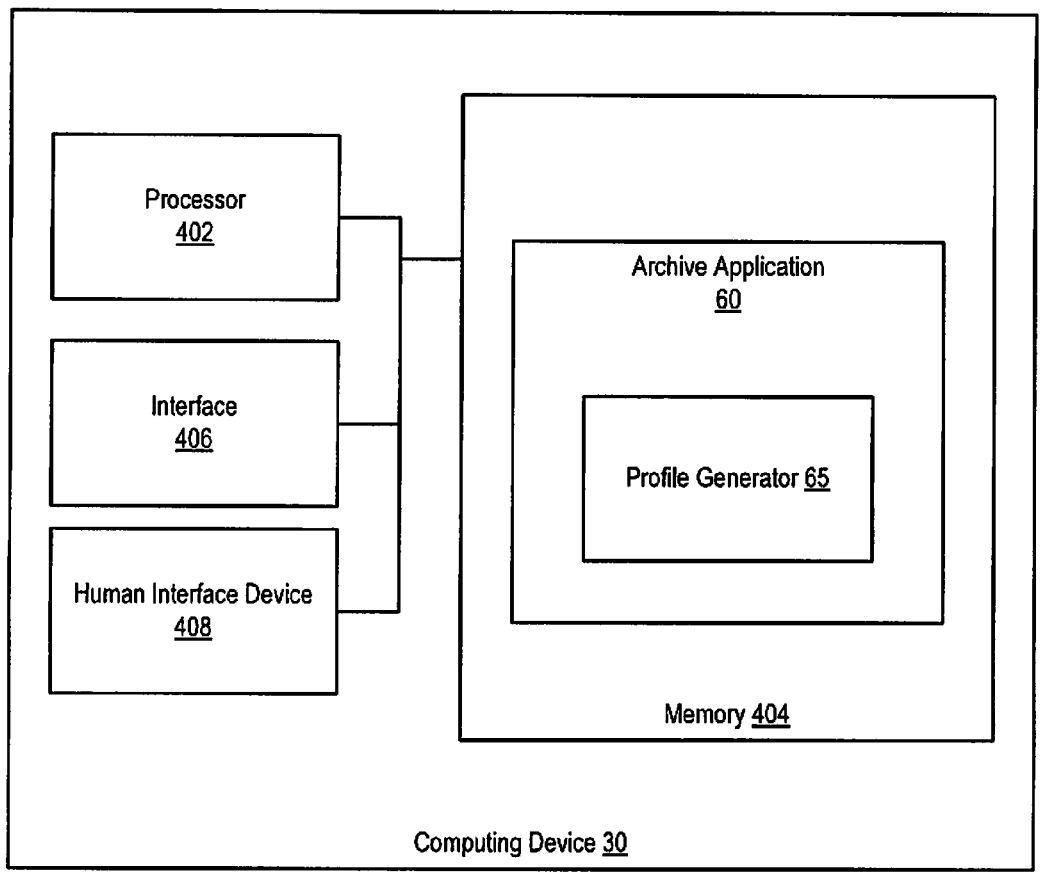
FIG. 4 is a block diagram showing how a computing device can implement an archive application in software, according to one embodiment of the present invention.

FIG. 4 is a block diagram showing how a computing device 30 can implement an archive application (e.g., archive application 60 of FIG. 1) in software. By executing the software that implements archive application 60, computing device 30 becomes a special purpose computing device that is configured to perform operations that include creating and using profiles to perform archive operations. The profiles indicate whether to include given storage containers (such as storage container 130 of FIG. 1) in the archive operations.

Computing device 30 can be a personal computer, network appliance, server, personal digital assistant, mobile phone, storage controller (e.g., an array controller, tape drive controller, or hard drive controller), laptop computer, or the like. In general, computing device 30 is configured to execute software or otherwise provide appropriate functionality to act as a component of the system described herein.

As illustrated, computing device 30 includes one or more processors 402 (e.g., microprocessors, programmable logic devices (PLDs), or application specific integrated circuits (ASICs)) configured to execute program instructions stored in memory 404. Memory 404 can include various types of RAM, Read Only Memory (ROM), Flash memory, micro electro-mechanical systems (MEMS) memory, magnetic core memory, and the like. Memory 404 can include both volatile and non-volatile memory. Computing device 30 also includes one or more interfaces 406. Processor 402, interface 406, and memory 404 are coupled to send and receive data and control signals by a bus or other interconnect.

Interface 406 can include a network interface to various networks (e.g., such as network 102 of FIG. 1) and/or interfaces to various peripheral buses. For example, interface 406 can include a network interface (e.g., implemented as a network interface card) via which messages generated by archive application 60 can be sent to other devices (e.g computing device 40 of FIG. 1) in order to, for example, initiate an archive operation. Interface 406 can also include an interface to one or more storage devices (e.g., on which containers (such as containers 130) and archives (such as archives 120) are stored).

In this example, program instructions and data executable to implement all or part of archive application 60 are stored in memory 404. Archive application 60 includes a profile generator 65, which is configured to generate a profile to be used to determine whether to archive selected containers. The process of generating a profile for a given set of containers transforms information associated with the containers' physical characteristics (e.g., size of items) into a profile that describes the contents of the containers.

Human interface device 408 can include one or more of a variety of different human user input and/or output devices, and/or one or more interfaces to such input and/or output devices. Such input and/or output devices can include monitors or other displays, keyboards, keypads, mice, electronic tablets, touch screens, audio speakers, and the like. Input (e.g., requesting access to a backup catalog) to and output from (e.g., the catalog) backup server 50 can be received and/or sent via such an input and/or output device.

The program instructions and data implementing archive application 60 can be stored on various computer readable storage media such as memory 404. In some embodiments, such software is stored on a computer readable storage medium such as a compact disc (CD), digital versatile disc (DVD), hard disk, optical disk, tape device, floppy disk, and the like). In order to be executed by processor 402, the instructions and data can be loaded into memory 404 from the other computer readable storage medium. The instructions and/or data can also be transferred to computing device 30 for storage in memory 404 via a network such as the Internet or upon a carrier medium.

Although the present invention has been described in connection with several embodiments, the invention is not intended to be limited to the specific forms set forth herein. On the contrary, it is intended to cover such alternatives, modifications, and equivalents as can be reasonably included within the scope of the invention as defined by the appended claims.

What is claimed is:

1. A method comprising:
   receiving a request to perform an archive operation on a plurality of containers, wherein the plurality of containers store data,
   the archive operation comprises creating a copy of at least a portion of the data,
   and the request is received by an archive computer system;
   selecting a first container of the plurality of containers, wherein the first container comprises an electronic mailbox;
   detecting whether the first container is to be excluded from the archive operation, wherein the detecting comprises evaluating information in a profile associated with the first container,
the information describes an amount of eligible data stored in the first container,
the first container comprises eligible data and ineligible data, and the first container is to be excluded if the amount of eligible data fails to satisfy a predetermined archive threshold;
comparing an amount of time elapsed since the profile was generated with a predetermined value; and
generating a new profile in response to detecting that the amount of time exceeds the predetermined value.

2. The method of claim 1, further comprising:
generating the profile, wherein
the generating comprises detecting the amount of eligible data in the first container, wherein
eligible data comprises data that will be eligible for archiving for at a specific point in time in the future.

3. The method of claim 1, wherein
the profile comprises a first entry associated with the first container, wherein
the first entry identifies a specific point in time in the future, and
the first entry comprises an indication of the amount of eligible data that corresponds to the specific point in time.

4. The method of claim 1, wherein
a first entry in the profile comprises information identifying a number of items stored in the first container.

5. The method of claim 1, wherein the first container comprises a file system.

6. The method of claim 1, wherein the profile is generated before the request is received.

7. A non-transitory computer readable storage medium storing program instructions executable by one or more processors to implement an archive application, wherein the archive application is configured to:
receive a request to perform an archive operation on a plurality of containers, wherein plurality of containers store data,
the archive operation comprises creating a copy of at least a portion of the data,
and the request is received by an archive computer system;
select a first container of the plurality of containers, wherein the first container comprises an electronic mailbox;
detect whether the first container is to be excluded from the archive operation, wherein
the detecting comprises evaluating information in a profile associated with the first container,
the information describes an amount of eligible data stored in the first container,
the first container comprises eligible data and ineligible data, and the first container is to be excluded if the amount of eligible data fails to satisfy a predetermined archive threshold;
comparing an amount of time elapsed since the profile was generated with a predetermined value; and
generating a new profile in response to detecting that the amount of time exceeds the predetermined value.

8. The non-transitory computer readable storage medium of claim 7, wherein the archive application is further configured to:
generate the profile, wherein
the generating comprises detecting the amount of eligible data in the first container, wherein
eligible data comprises data that will be eligible for archiving at a specific point in time in the future.

9. The non-transitory computer readable storage medium of claim 7, wherein
the profile comprises a first entry associated with the first container, wherein
the first entry identifies a specific point in time in the future, and
the first entry comprises an indication of the amount of eligible data that corresponds to the specific point in time.

10. The non-transitory computer readable storage medium of claim 7, wherein
a first entry in the profile comprises information identifying a number of items stored in the first container.

11. The non-transitory computer readable storage medium of claim 7, wherein the profile is generated before the request is received.

12. A system, comprising: one or more processors; and a memory coupled to the one or more processors, the memory storing program instructions executable by the one or more processors to implement an archive application, wherein the archive application is configured to:
receive a request to perform an archive operation on a plurality of containers, wherein plurality of containers store data,
the archive operation comprises creating a copy of at least a portion of the data,
and the request is received by an archive computer system;
select a first container of the plurality of containers, wherein the first container comprises an electronic mailbox;
detect whether the first container is to be excluded from the archive operation, wherein the detecting comprises evaluating information in a profile associated with the first container,
the information describes an amount of eligible data stored in the first container,
the first container comprises eligible data and ineligible data, and the first container is to be excluded if the amount of eligible data fails to satisfy a predetermined archive threshold;
comparing an amount of time elapsed since the profile was generated with a predetermined value; and
generating a new profile in response to detecting that the amount of time exceeds the predetermined value.

13. The system of claim 12, wherein the archive application is further configured to:
generate the profile, wherein
the generating comprises detecting the amount of eligible data in the first container, wherein
eligible data comprises data that will be eligible for archiving at a specific point in time in the future.

14. The system of claim 12, wherein a first entry in the profile comprises information identifying a number of items stored in the first container.

15. The system of claim 12, wherein the profile is generated before the request is received.

* * * * *